Figure 1:
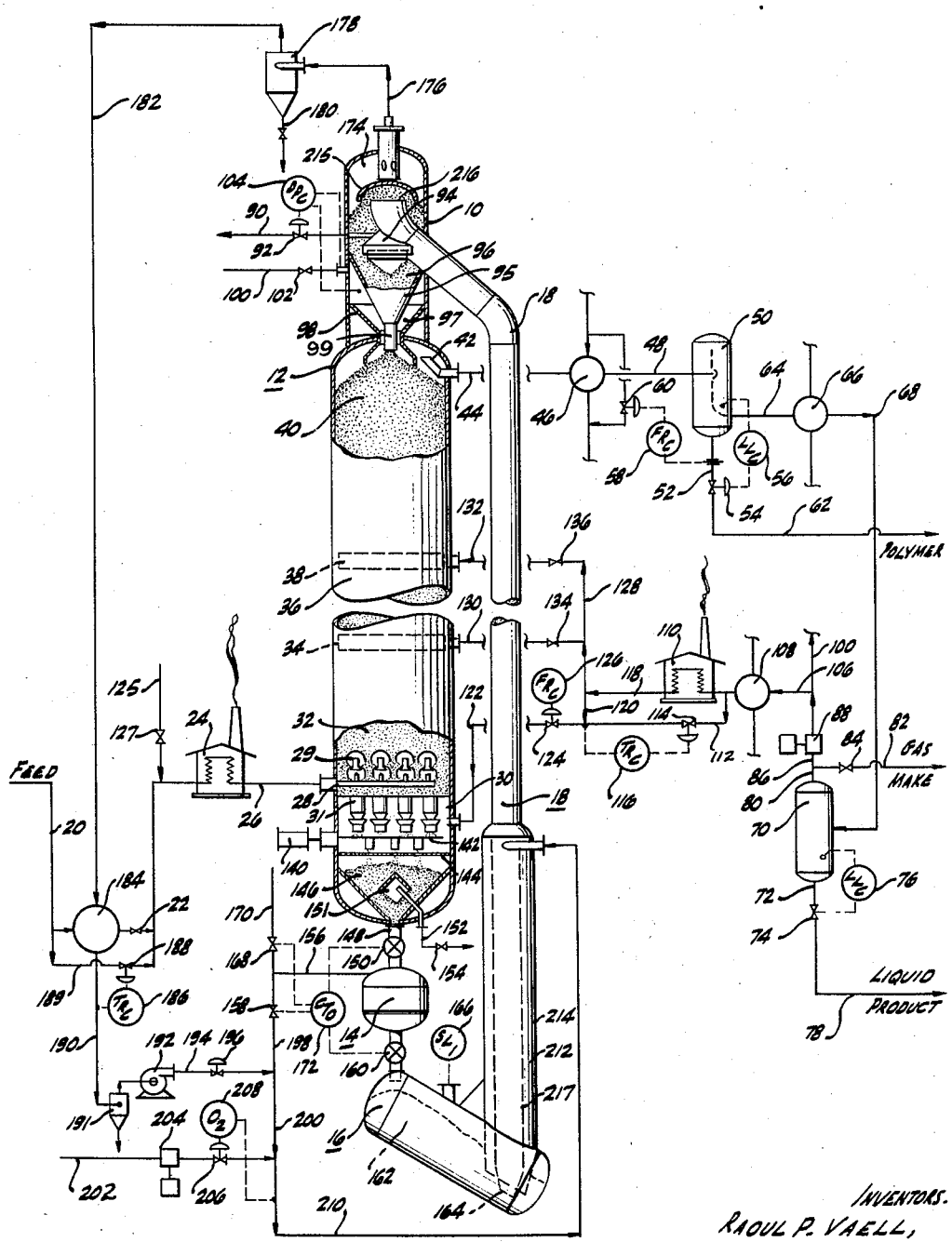

Nov. 17, 1959   R. F. DEERING ET AL   2,913,399
SOLIDS-FLUID CONTACTING PROCESS AND APPARATUS
Filed Feb. 27, 1956   2 Sheets-Sheet 1

INVENTORS.
RAOUL P. VAELL,
ROLAND F. DEERING,
JOHN H. DUIR,
BY
ATTORNEY.

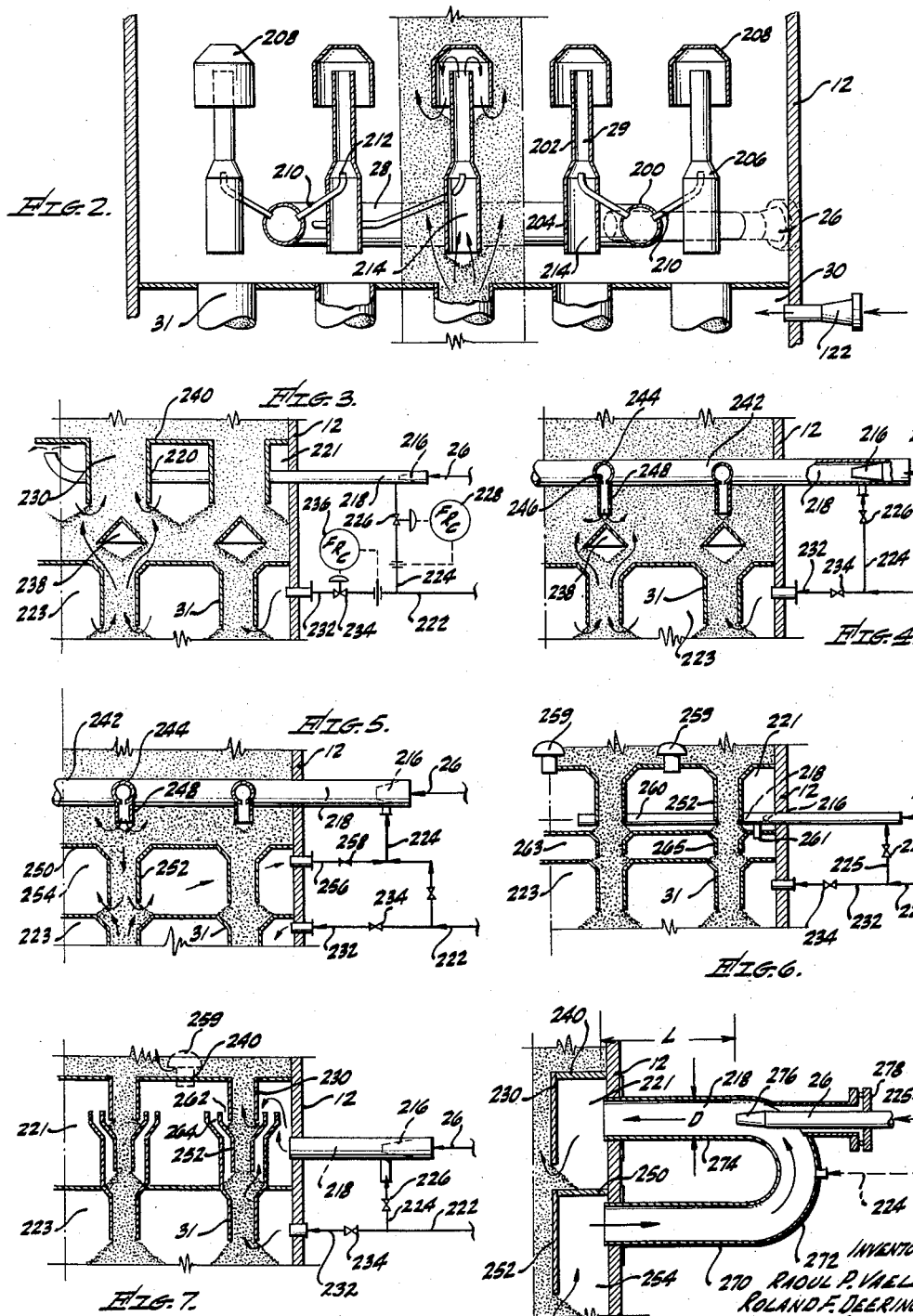

United States Patent Office 2,913,399
Patented Nov. 17, 1959

2,913,399

SOLIDS-FLUID CONTACTING PROCESS AND APPARATUS

Roland F. Deering, Whittier, John H. Duir, Fullerton, and Raoul P. Vaell, Los Angeles, Calif., assignors to Union Oil Company of California, Los Angeles, Calif., a corporation of California Application February 27, 1956, Serial No. 567,997

10 Claims. (Cl. 208—136)

This invention relates to solids-fluid contacting processes such as those in which low grade hydrocarbon fractions are upgraded at controlled reaction temperatures and pressures and compositions by contacting them with a catalyst. Particularly this invention relates to an improved process of this type in which two fluid reactants are employed and which are premixed in a particular way just prior to contact with the catalyst.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 1000° F. and including the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, diesel or jet engine fuels, and the like.

Many of these processes employ, in addition to the principal or primary reactant to be upgraded, an additional or secondary reactant which is passed through the reaction zone therewith in the presence of the contact material. For example, in hydrocarbon reforming, cyclization, dehydrogenation and hydrogenation, desulfurization, denitrogenation, hydrocracking, and the like, this secondary reactant is a recycle stream containing substantial quantities of hydrogen. The amount relative to the primary reactant is controlled thereby varying the composition of the reacting fluid mixture so as to control the course of the reaction and to obtain the desired products while minimizing side reactions.

Since the temperature of the treatment is frequently near that at which either the primary or secondary reactants undergo undesirable side reactions such as catalytic or thermal decomposition, the primary and secondary reactants must be very carefully handled so as to eliminate these undesirable results. It has been found that thorough premixing of the reactants, a hydrocarbon vapor and hydrogen in the case of the hydrocarbon upgrading referred to previously, effectively reduces the undesirable results. Particularly with respect to hydrocarbon upgrading the premixing must be at least partly accomplished in the absence of the contact material or catalyst. Failure to premix the hydrocarbon or primary reactant with at least a substantial part of the hydrogen or secondary reactant has been found to result in undue reactant decomposition, low liquid yield, inefficient treatment of the feed, a rapidly deactivated catalyst, and an undesirably increased catalyst regeneration load.

In these hydrocarbon upgrading processes in particular, and also in other contacting processes employing a recirculating solid contact material, the spent solids removed from the reaction zone include residual quantities of occluded or adsorbed reactant. These materials must be recovered in order to maintain high yields and minimize the load on the catalyst regeneration system. It has been found that this recovery can be effected with great efficiency by stripping the spent catalyst in the absence of the primary reactant hydrocarbon with at least part of the secondary reactant hydrogen. The hydrogen strips the residual hydrocarbon from the catalyst forming a mixture of these components which can be returned to the reaction zone for treatment with the feed mixture. Again the problem of efficient mixing arises due to the fact that the stripped mixture of components ordinarily has a different composition than the mixture of fresh feed and hydrogen. Failure to mix these materials has been found to result in the undesirable reactions and results referred to above with respect to the fresh feed.

The present invention therefore relates to an improved process and apparatus for solids-fluid contacting in which two reactant fluids are used and in which specific steps and means are employed to eliminate the foregoing undesirable effects. The invention has proven itself particularly effective in the catalytic treatment of low grade naphthas contaminated with hydrocarbon derivatives of sulfur or nitrogen or both, and either straight run or cracked or a mixture of the two, to produce a sweet gasoline blending stock of high knock rating.

It is therefore a primary object of this invention to provide an improved solids-fluid contacting process utilizing two reactant fluids thoroughly premixed before contact with solids.

It is a more particular object to provide an improved catalytic upgrading or conversion process for hydrocarbons which is effected in the presence of recycled hydrogen.

It is a specific object of this invention to provide in such processes for the premixing of the hydrocarbon feed as primary reactant with at least a substantial part of the recycle hydrogen as secondary reactant at a point upstream from that at which the mixture contacts the solid material.

It is a further object of this invention to provide in such processes the improved step of stripping the spent catalyst with at least a minor part of the secondary reactant to produce a mixture of fluids which is itself thoroughly mixed with a fresh feed prior to contacting the bulk of the solid contact material.

It is a further object of this invention to provide several modifications of an improved apparatus capable of effecting the foregoing objects.

Other objects and advantages of the present invention will become apparent to those skilled in the art as the description and illustration thereof proceed.

Briefly the present invention comprises a process and apparatus for solids-fluid contacting in which a primary and a secondary fluid reactant are employed and in which the efficient premixing of reactants in the absence of the contact material is provided. As an example of the process in which the present invention is particularly applicable, a hydrocarbon vapor is treated in the presence of a solid catalyst and a recirculating stream of hydrogen. The hydrogen or secondary reactant is passed through the reactor with the primary or hydrocarbon reactant. Since the presence of the hydrogen has a marked effect on the reaction, the hydrocarbon feed vapor is passed as at least one high velocity stream through a restriction into a mixing zone and controlled so as to generate therein a reduced pressure. Into this low pressure zone the hydrogen is introduced. The high velocity stream is best obtained by expanding the hydrocarbon through a nozzle directly into the enlarged and surrounding mixing zone. The primary reactant issues from the nozzle, its velocity head is increased simultaneously with a decrease in its pressure head. By maintaining the pressure head of the primary reactant in the mixing zone at a value less than the pressure head of the secondary reactant to be introduced, the secondary reactant is drawn into this low pressure region at a rate determined by the pressure differential and by the physical size of the equipment. The pressure head within the mixing zone is determined by the velocity of the primary reactant, the size or cross sectional area of the nozzle, and the pressure at which the primary reactant exists upstream from the nozzle.

The jet of high velocity hydrocarbon in the mixing zone downstream from the nozzle creates a very great turbulence which is sufficient to mix the hydrocarbon and hydrogen reactants and produce a feed mixture of uniform composition provided the length of the mixing zone measured downstream from the nozzle outlet is at least three times and preferably five times the diameter of the mixing zone. Not only does the flow of hydrocarbon reactant induce the flow of the hydrogen reactant into the system, it also effects the complete mixing of the primary and secondary reactants which is required in this process. The mixing chamber opens at its downstream end into the bed of solid contact material so that the hydrocarbon never contacts this material except insofar as it is uniformly mixed with at least a substantial part of the hydrogen.

In the various modifications of apparatus in which the present invention may be effected it will be noted that either one or a plurality of these mixing devices may be employed, and they may be disposed inside or outside the column. From a standpoint of easy maintenance, they are preferably disposed outside of the contacting column. With contacting columns of relatively large cross sectional area it is most often desirable to utilize a plurality of such devices suitably manifolded together and disposed either around the outside of the column or throughout the cross section area inside the column in a uniform geometric pattern.

In the catalytic upgrading of low grade naphthas, the naphtha is passed in the vapor phase through one or more expansion nozzles or orifices as one or more high velocity streams, each stream discharging coaxially into a relatively elongated mixing zone in which the low pressure head is maintained. The mixing zone is open at both ends. At its inlet end adjacent the nozzle opening it opens to a source of hydrogen-containing gas. At its outlet end it communicates with the zone in which the solid contact material is maintained. Part of the recycle hydrogen may be premixed with the naphtha feed upstream from the nozzle if desired. Preferably most of the recycle hydrogen however is drawn into the mixing zone surrounding the high velocity jet of hydrocarbon to form the uniform reactant mixture referred to above which passes into contact with the solid contact material. Preferably an additional part of the recycle hydrogen is employed to strip the spent catalyst solids continuously removed from the contacting zone forming a mixture of recovered residual hydrocarbon and stripping hydrogen. This mixture is retreated preferably by drawing it into the low pressure mixing zone thereby disengaging it from the stripped catalyst and thoroughly mixing it with the mixture of naphtha feed and hydrogen recycle gas. In this way a completely uniform mixture of recycle gas and hydrocarbon is introduced into contact with the catalyst in such a manner that substantial reductions in coke laydown and regenerator burn-off load are realized.

The contacting process and apparatus in general and the specific modifications for premixing primary and secondary reactants in any contacting process will be more clearly understood by reference to the accompanying drawings in which:

Figure 1 is an elevation view in partial cross section of a solids-fluid contacting process utilizing the principles of the present invention in a hydrocarbon upgrading operation, Figure 2 is a detailed elevation view in cross section of one form of reactant premixing in which a plurality of jets within the confines of a contacting column is used, Figures 3 through 7 are elevation views in cross section of the various modifications of structures capable of effecting the present invention and which utilize one or more high velocity streams of primary feed, and are located either inside or outside of the column, and Figure 8 is an elevation view in cross section showing the detail of an apparatus employing a single high velocity stream of primary reactant.

Referring now more particularly to Figure 1, the contacting apparatus consists essentially of a column having at successively lower levels a catalyst separator and pretreating chamber 10 into which the regenerated catalyst is discharged, a naphtha upgrading column 12 through which the catalyst passes downwardly as a moving bed by gravity, a catalyst pressuring chamber 14 receiving spent catalyst from upgrading chamber 12, and an induction chamber 16 into which the spent pressured catalyst is discharged. Conveyance-regeneration chamber 18 through which the spent catalyst is conveyed and regenerated extends upwardly parallel to the aforementioned elements from chamber 16 into separator chamber 10.

The apparatus of this invention as shown in the drawing is for the catalytic upgrading by reforming and desulfurization of 1100 barrels per stream day of a petroleum naphtha having the following properties:

*Table I.—Naphtha feed*

| | |
|---|---|
| Boiling range, °F | 240–420 |
| A.P.I. gravity | 46.3° |
| Sulfur, weight percent | 0.578 |
| Nitrogen, weight percent | 0.020 |
| Knock rating (F–1 clear) | 61.8 |
| Naphthenes, volume percent | 42 |
| Aromatics, volume percent | 15 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p.s.i.g. into naphtha engaging zone 28 in column 12 and from which the upwardly directed high velocity streams of naphtha pass into mixing zones 29. A primary stream of recycle gas containing hydrogen is introduced through primary recycle gas engaging zone 30 at a rate of 1700 M s.c.f. (1000 standard cubic feet) per day and at a temperature of 900° F. and strips spent catalyst in stripping zones 31. A detail drawing of one modification of the naphtha engaging zone and also showing the spent catalyst stripping zone appears in Figure 2. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes and the endothermic aromatization of the naphthene hydrocarbons takes place resulting in a temperature decrease of the reactants. To maintain an approximately constant temperature profile throughout reaction column 12, a secondary hydrogen recycle gas stream is introduced into secondary recycle gas engaging zone 34 at a temperature of 1150° F. and at a rate of 1130 M s.c.f. per day to increase the temperature of the reacting mixture to about 910° F. The thus reheated mixture passes countercurrent to the catalyst through secondary reforming zone 36 wherein a further temperature decrease takes place due to the continuing endothermic aromatization reactions. A tertiary stream of recycle gas at 1150° F. is introduced into tertiary recycle gas engaging zone 38 at a rate of 1290 M s.c.f. per day to raise the reactant mixture temperature again to about 910° F. The mixture then continues upwardly through tertiary reforming zone 40 from which the effluent is removed from disengaging zone 42 at a temperature of about 880° F. and at 400 p.s.i.g. through line 44.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The cooled and partially condensed effluent then passes through line 48 and is introduced into centrifugal separator 50 which preferably is a type known as a Webre cyclone. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52, operates coolant bypass valve 60 so that the hot effluent flowing through line 44 is cooled sufficiently to condense that desired proportion of the reactor effluent.

The preferred proportion so condensed is a very minor amount ranging from 0.01% up to about 10% by volume. Preferably this proportion is between about 0.1% and about 5%, and in the experimental verification of the present invention it has been found that partial condensation of about 2.2% by volume was sufficient to substantially eliminate the so-called heavy ends or polymer from the effluent so as to avoid the usual necessity for rerunning the depropanized liquid product, which invariably results in some thermal degradation forming additional high boiling polymeric materials.

In gasoline reforming, slightly more than 2% by volume of the effluent is condensed and is removed at a rate of 22 barrels per day by means of line 62. This material contains some reformed gasoline boiling below about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

Table II.—Reformed naphtha product

| | |
|---|---|
| Boiling range, ° F. | 94–435 |
| A.P.I. gravity | 51.7 |
| Sulfur, weight percent | 0.004 |
| Nitrogen, weight percent | |
| Knock rating (F-1+3 cc. TEL) | 95 |
| Naphthenes, volume percent | 14 |
| Aromatics, volume percent | 40 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 M s.c.f per day controlled by valve 84. Part or all of this gas may be employed as fuel in the fired heaters in the process if desired.

The remaining recycle gas is passed through line 86 and is compressed from 375 p.s.i.g. to 425 p.s.i.g. in recycle gas compressor 88. Part of this compressed recycle gas is passed as a regenerated catalyst pretreating gas through line 100 at a rate of 165 M s.c.f. per day controlled by valve 102 into separator and catalyst pretreating chamber 10. This pretreating gas is introduced below and around cone-shaped baffle 95 and passes therefrom downwardly through the annular space 97 constituting a pretreating gas engaging zone within the lower periphery of baffle 98 and then directly into the bed of regenerated catalyst within baffle 98 at the top of chamber 10. A primary portion of the pretreating gas passes through the solids within baffle 98 and radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10.

A secondary portion of this pretreating gas passes upwardly through sealing leg 99 and pretreating zone 96 countercurrently to the regenerated catalyst. By means of this concurrent passage of gas the catalyst is pretreated with hydrogen to reduce the higher oxides of cobalt and molybdenum formed during regeneration to the lower oxides. The pretreating gas, along with the secondary portion of regeneration gas subsequently described coming down from the top of the lift line with the regenerated catalyst, is removed from beneath baffle or pretreating and sealing gas disengaging zone 94 through line 90 controlled by valve 92, at a rate of 205 M s.c.f. per day. Valve 92 is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M s.c.f. per day through line 106 and is preheated in interchanger 108 to 350° F. in exchange with the reactor effluent after polymer removal (interchanger 66). Of this preheated recycle gas, 3460 M s.c.f. per day are further heated in fired preheater 110 to a temperature of 1150° F., and 660 M s.c.f. per day passed through bypass line 112 at a rate controlled by valve 114 in response to temperature recorder controller 116. The primary hydrogen recycle gas, introduced into engaging zone 30 at a rate of 1700 M s.c.f. per day and at 900° F., is produced by mixing 1040 M s.c.f per day of 1150° F. hydrogen flowing through lines 118 and 120 with the 660 M s.c.f. per day of cooler hydrogen from line 112 and this material is then introduced through line 122 into the primary recycle gas engaging zone 30 at a rate controlled by valve 124 in response to flow recorder controller 126. If desired, some of this hydrogen recycle gas may be added to the feed through line 125 controlled by valve 127 prior to heater 24.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s.c.f. per day and 1290 M s.c.f. per day controlled by valves 134 and 136 respectively.

The spent hydrocarbonaceous catalyst passes downwardly in the column 12 and is stripped with hydrogen in stripping zones 31. The solid catalyst rate is controlled by means of a reciprocating tray 142 driven by means 140 and a lower stationary tray 144. Upon reciprocation of tray 142 a substantially constant volumetric withdrawal of spent catalyst uniformly throughout the cross-sectional area of column 12 is achieved. Spent catalyst from feeder tray 142 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p.s.i.g. causing a displacement gas to flow upwardly through outlet 148 into the bottom of reactor 12. A second seal gas comprising a mixture of this last-named gas and a small portion of the primary recycle gas stream, which passes downwardly through solids feeder 140, is removed from disengaging zone 151 through line 152 at a rate of 140 M s.c.f. per day controlled by valve 154. This gas is mixed with the spent catalyst pretreating gas removed from the upper part of the column through line 90 and is employed as fuel.

The spent granular solids in pressuring chamber 14 are raised in pressure to 430 p.s.i.g. by the introduction of regeneration recycle gas through manifold 156 upon the opening of valve 158 described below. Following this pressuring step, valve 160 is opened and the pressured solids are discharged by gravity into induction chamber 16 of spent granular catalyst to be conveyed and regenerated so as to submerge the lower inlet opening 164 of the conveyance-regeneration chamber. Level indicator 166 is provided to indicate the solids level of bed 162 and the catalyst inventory in the system.

Valve 160 is then closed, motor valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by the reciprocating tray 142 in the solids feeder.

Referring now to solids pretreater and separator 10, spent conveyance-regeneration gases are disengaged from the conveyed solids and a primary or major portion collecting in space 174 is removed therefrom through line 176 at a rate of 1612 M s.c.f. per day and a temperature of 984° F. A secondary or minor stream passes downwardly with the solids and enters pretreating and seal gas disengaging zone 94 as described. This primary gas portion is passed into solids separator 178 wherein any catalyst fines elutriated from the catalyst stream in separator 10 are removed from the regeneration gas recycle. These solids are removed from separator 178 by means of line 180. The solids-free recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 in line 189 so as to control the naphtha coolant passing through interchanger 184. The cooled recycle gas passes through line 190 and is compressed to 430 p.s.i.g. in compressor 192. This recycle gas then flows through line 194 at a rate controlled by valve 196 and is divided into a solids pressuring stream flowing through line 198 to pressure solids in chamber 14, and a regeneration-conveyance stream flowing through line 200.

An oxygen-containing gas, such as air, is introduced via line 202. It is compressed to 433 p.s.i.g. in compressor 204 and is introduced at a rate of 123 M s.c.f. per day controlled by valve 206 in response to oxygen recorder controller 208 for combination with the compressed conveyance-regeneration recycle gas flowing through line 200. The combined oxygen-containing conveyance-regeneration gas, which may contain from about 0.1 to about 10% oxygen and preferably from 0.5 to 5.0% oxygen, then passes at a temperature of about 646° F. and at a rate of 1735 M s.c.f. per day through line 210 tangentially into the upper portion of annular regenerator heat exchange zone 212. This zone is contained within the annulus between the lower portion of conveyance-regeneration conduit 18 and jacket 214 concentric around the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof. As stated above, the major part of the coke burn-off from the catalyst occurs in the lower or first part of the conveyance-regeneration zone and a substantial part of this exothermic heat is transferred through the conveyance conduit wall to preheat the conveyance-regeneration gas recycle and to keep the inner conveyance-regeneration conduit wall 217 cool. All of the net endothermic heat of regeneration however is removed as sensible heat in the conveyance-regeneration recycle gas stream, with the exception of usual heat losses.

The spent granular catalyst is substantially regenerated while passing upwardly through the conveyance-regeneration conduit and is discharged from outlet opening 216 of the conveyance conduit into separator chamber 10, previously described.

Referring now in general to Figures 2 through 7, several modifications of the process of this invention and the apparatus in which it is effected are shown. All of these modifications have in common the steps of maintaining a jet or high velocity stream of hydrocarbon or primary feed opening into a mixing zone in which a low pressure region is generated and maintained, the introduction of at least part of the recycle hydrogen or secondary reactant into this low pressure region either by premixing this part of the hydrogen with the hydrocarbon feed or by drawing it separately into the low pressure zone, incorporating with this mixture of hydrocarbon and recycle hydrogen the hydrocarbons stripped from the spent catalyst by means of the hydrogen stripping gas, either by straight mixing of the two hydrocarbon-hydrogen streams in or out of contact with the catalyst bed, or by drawing it into the low pressure region created by the high velocity hydrocarbon stream, and then introducing the whole mixture of hydrocarbon and hydrogen into contact with the solid catalyst in the main reaction or contacting zone.

In Figures 2 through 8 common elements are designated by the same numbers.

Referring now more particularly to Figure 2 the walls of contacting column 12 are shown including naphtha inlet line 26, and stripping hydrogen engaging zone 30 into which line 122 opens. Spent catalyst stripping tubes 31 are also shown through which the stripping hydrogen stream passes countercurrent to the spent solids. Ring manifold 200 (equivalent to 28 in Figure 1) is provided into which inlet line 26 opens. Supported by conventional means not shown, a plurality of elongated mixing zones 29 is provided. The mixing zone consists of an upper cylindrical mixing portion 202 and a lower cylindrical skirt or low pressure portion 204 of larger diameter. A conical section 206 connects the two. A cap 208 is disposed at the upper end of the mixing zone. The catalyst passes downwardly around this assembly and individual streams of naphtha are injected from ring manifold 200 through inlet lines 210 which may be provided with an orifice or nozzle 212. The incoming hydrocarbon or primary reactant is thus directed as a high velocity stream upwardly through mixing zone 29 creating therein the low pressure which extends downwardly into the lower zone 214.

The stripping hydrogen introduced through line 122 passes upwardly through and removes residual naphtha from spent catalyst in stripping zones 31. This mixture passes upwardly into the main body of catalyst surrounding the feed-engaging structure zone in Figure 2, and flows by virtue of the reduced pressure into the low pressure zone 214 and on into mixing zone 29 into which the naphtha is passed as a high velocity stream. The naphtha is herein thoroughly mixed due to the turbulent flow conditions with the stripped naphtha and stripping hydrogen and the mixture thus formed flows outwardly from below caps 208 and upwardly through the catalyst bed.

In this modification part of the recycle hydrogen is added to the naphtha upstream from the nozzles. They are thoroughly mixed with each other in the nozzle and mixing zone, and this mixture is mixed with the stripped naphtha and stripping hydrogen by drawing the stripped mixture into the low pressure mixing zone.

Referring now more particularly to Figure 3, the feed naphtha enters through line 26 and is pumped through nozzle 216 located outside of the column. The low pressure mixing zone 218 is created within the inlet conduit 220 which extends into a central point within the column. The hydrogen flowing through line 222 is divided, the recycle portion flowing through line 224 at a rate controlled by valve 226 and flow recorder controller 228 into the low pressure mixing zone 218. This forms a mixture of feed hydrocarbon and recycle hydrogen which is introduced upwardly through downcomers 230 into the catalyst bed, or through risers and caps as shown at 259 in Figures 6 and 7. At the same time the stripping gas portion flows on through line 232 at a rate controlled by valve 234 and flow recorder controller 236. This gas passes upwardly through stripping tubes 31 forming a mixture of stripped naphtha and stripping hydrogen which in turn flows upwardly around conical baffles 238 mixing with the feed naphtha and recycle hydrogen mixture while in contact with the spent catalyst at points located adjacent the lower periphery of downcomers 230.

In this modification a single high velocity stream of feed naphtha is disposed outside of contacting column 12, the recycle hydrogen is mixed therewith by drawing it into the low pressure zone maintained by the jet of naphtha, and this feed-recycle hydrogen mixture is further mixed with the stripped naphtha while in contact with the catalyst bed. Several jets may be used if desired in the same way.

Referring now to Figure 4, it is noted that most all of the elements of Figure 3 are also shown. The only modification here involves the means for distributing the naphtha-recycle hydrogen mixture throughout the cross sectional area of column 12. In Figure 3 this was accomplished by means of an engaging tray 240 provided with dependent downcomers 230. In Figure 4 this tray is substituted with a tubular manifold 242 from which branch manifolds 244 open. These branch manifolds are provided with orifices 246 opening downwardly through a dependent skirt 248 directly into the catalyst bed. Herein the stripped naphtha and stripping hydrogen mixture is also mixed with the feed naphtha and recycle hydrogen mixture adjacent the lower periphery of the skirt 248 and in contact with the moving catalyst bed. The instrumentation shown in Figure 3 may of course be employed in the apparatus of Figure 4, as well as in that of the other figures.

Referring now to Figure 5 a further modification of the present invention is shown in which the naphtha and recycle hydrogen engaging manifold of Figure 4 is employed, but in which sealing leg tray 250 and dependent sealing legs 252 have been employed forming a stripped naphtha and stripping hydrogen disengaging zone 254 to be interposed between the feed engaging manifold 242 and the stripping tubes 31. The stripping hydrogen enters through line 232, passes upwardly through tubes 31, and forms the stripped naphtha and stripping hydrogen mixture. Because of the high resistance to fluid flow through the relatively small diameter sealing legs 252 and because of the low pressure region created in mixing zone 218 by means of jet 216, the stripped naphtha passes out of the column through line 256 provided with valve 258 and through line 224 along with the recycle hydrogen into the mixing zone. In this modification then a single high velocity jet of naphtha is employed to mix the feed naphtha with not only the recycle hydrogen but also the mixture of stripped naphtha and stripping hydrogen which is disengaged from the stripped catalyst inside the column. Again several high velocity jets can be used in the same way.

Referring now more particularly to Figure 6, a modification of the device in Figure 5 is shown employing either a single or a plurality of jets 216 located inside the column and within an inlet line 260. The naphtha is again introduced through line 26 and the hydrogen introduced through line 222 is divided. The recycle hydrogen passes through line 225 controlled by valve 227 for premixing with the naphtha feed at a point upstream from the nozzle 216, and the stripping hydrogen flows through line 232 controlled by valve 234 into catalyst stripping tubes 31. The modification here involves the direct internal connection 261 located inside the column and communicating disengaging zone 263 around sealing legs 265 just above the top of stripping conduits 31 with the low pressure zone 218 disposed just downstream from nozzle 216.

In this modification a single or a plurality of high velocity naphtha streams are located inside the column, the recycle hydrogen is introduced by premixing it with the feed hydrocarbon, and this mixture is mixed with the stripped naphtha and the stripping hydrogen by drawing the latter mixture into the low pressure zone through a connection located within the column, and the uniform mixture so formed is passed up into contact with the solids through caps and risers 259.

Referring now particularly to Figure 7 a still further modification is shown incorporating sealing legs 252 just as were employed in Figures 5 and 6, but herein the stripped naphtha and stripping hydrogen mixture is mixed directly with the feed naphtha and recycle hydrogen mixture in a free space in which no catalyst particles are present, rather than drawing this mixture into the low pressure zone as in Figure 6 or combining it in the presence of the catalyst as in Figures 3 and 4. Again naphtha is introduced through line 26 and passes through nozzle 216 so as to maintain in mixing zone 218 the low pressure region referred to above. Into this low pressure zone is drawn the recycle hydrogen from line 222 through line 224 provided with valve 226. The feed naphtha and recycle hydrogen mixture enter feed engaging zone 221, and passes downwardly through inner annulus 262 and then upwardly through downcomer 230 into catalyst bed above tray 240. The stripping hydrogen passes through line 232 controlled by valve 234 into stripping gas engaging zone 223, upwardly through stripping zones 31 and then is disengaged from the spent catalyst by flow upwardly through the outer annulus 264 because of the high resistance flow path through the solids in sealing leg 252. This stripped naphtha and stripping hydrogen mixture is engaged in the gas space adjacent the upper ends of inner annulus 262 and outer annulus 264 as shown, or it preferably passes upwardly through optional bubble cap 259 shown in broken lines.

In this modification the jet of naphtha in low pressure zone 218 draws thereinto the recycle hydrogen stream at a point outside the column and this mixture is mixed within the column with the stripped naphtha in a solids free space at a point above each stripping zone.

Referring finally to Figure 8 an elevation view in cross section showing the detail of the apparatus in which the high velocity naphtha streams are generated is shown. Herein column 12 is provided with a naphtha feed engaging zone 221 composed of disengaging tray 240 and downcomer tubes 230. Disposed below this is stripped naphtha and stripping hydrogen disengaging zone 254 composed of tray 250 and sealing leg tubes 252 as indicated in Figure 5.

An outlet line 270 is terminated in a 180° return bend 272 which communicates directly with inlet line 274 which is the low pressure or mixing zone. Preferably the length L of mixing zone 218 is approximately five times the diameter D.

Opening coaxially at the upstream end of low pressure zone 218 is naphtha inlet line 26 which may be provided at its end with a nozzle 276 to increase the velocity head of the entering fluid. Inlet line 26 is supported and sealed by means of flanged fitting 278. As indicated previously the recycle hydrogen fraction may be premixed with the naphtha by means of line 225 as indicated in Figure 6 or it may be drawn into low pressure zone 218 by introduction through line 224 as indicated in Figures 3, 4, 5, and 7.

As should be apparent from the foregoing illustration of the various modifications of this invention, the principles include the maintenance of a high velocity stream or jet of the primary reactant or hydrocarbon feed so controlled as to generate and maintain a low pressure region in the mixing zone into which it is discharged. At least part of the recycle hydrogen or secondary reactant is mixed with this incoming hydrocarbon either by premixing it with the hydrocarbon upstream from the high velocity jet or by drawing it into the low pressure zone created thereby. Simultaneously another part of the hydrogen is employed to strip residual hydrocarbon from the moving solids and the hydrocarbon and stripping hydrogen mixture thus formed is mixed with the feed mixture of feed hydrocarbon and recycle hydrogen simply by bringing these two streams together inside the contacting column, either in contact or out of contact with the catalyst solids, or by drawing this mixture also into the low pressure zone created by the high velocity stream of primary reactant. Finally the total mixture of reactants thus formed is introduced into contact with the catalyst mass or other solids granular contact material.

In applying the present invention on an industrial scale to the upgrading of a mixed cracked and straight run naphtha of low knock rating, a modification of the apparatus of this invention was employed substantially as shown in Figure 2 and in a process and general apparatus substantially as indicated in Figure 1. The process has been generally described in connection with Figure 1 and the results of the modification of it to incorporate the device of the type described and the process discussed in connection with Figures 2 through 8 was to decrease the quantity of coke burn-off required in the regeneration system by about 45 percent due to a corresponding decrease in coke laydown on the catalyst in the reactor. The knock rating of the product obtained increased from 94 to 96 F-1+3 ml. TEL.

The foregoing discussion and illustration of this invention have involved primarily the catalytic upgrading of hydrocarbons of low quality in the presence of a stream of hydrogen. Although the present invention has markedly improved the performance of such upgrading processes, such improvements or at least some of them are obtained in other processes in which a primary and a secondary fluid reactant are simultaneously passed through a reactor in contact with any granular solid contact material. For example, processes employing such primary and secondary reactant fluids include naphtha reforming, desulfurization, hydrocracking, isomerization, hydrogenation, and others well known to those skilled in the art of catalytic treatment of fluids.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a process for upgrading a hydrocarbon feed by contact with a moving bed of solid upgrading catalyst in the presence of hydrogen in a contacting zone, wherein spent catalyst is removed from said contacting zone, stripped with at least a portion of the hydrogen to be used in said contacting zone to remove hydrocarbons therefrom, and wherein the effluent from said stripping step, containing both hydrogen and stripped hydrocarbons, is then mingled with said hydrocarbon feed for treatment in said contacting zone, the improved method for effecting said mingling and contacting, which comprises withdrawing said stripping effluent from said stripping step and introducing the same directly into a turbulent, low-pressure, catalyst-free feed-mixing zone, said mixing zone being formed by (1) maintaining a high velocity jet of vaporized feed into an elongated, catalyst-free passage forming said mixing zone, and (2) controlling the flow of said vaporized feed to said mixing zone to maintain turbulent flow conditions and a relatively low pressure therein, then contacting the resulting mixture of feed vapors and stripping effluent with the catalyst in said contacting zone, and recovering therefrom an upgraded hydrocarbon product.

2. In a process for the catalytic upgrading of hydrocarbons in the presence of hydrogen which comprises the steps of recirculating a solid catalyst through an upgrading zone and a regeneration zone, passing a hydrocarbon through said upgrading zone in the presence of hydrogen to produce an upgraded hydrocarbon product, cooling and partially condensing said product to produce a liquid product and hydrogen-containing gas for recirculation through said upgrading zone, and passing an oxygen-containing gas through said regeneration zone to produce regenerated catalyst, the improvement in introducing said hydrocarbon and said hydrogen into said upgrading zone so as to minimize loss of hydrocarbon by coke laydown on the catalyst, which comprises vaporizing the hydrocarbon to be upgraded, mixing hydrogen therewith to form a feed hydrocarbon-hydrogen mixture, injecting said feed mixture as a plurality of high velocity jets one each into a plurality of elongated, catalyst-free mixing zones to maintain a turbulent flow of hydrocarbon-hydrogen therein at a pressure below that of said upgrading zone, passing a gas containing hydrogen into contact with spent catalyst flowing from said upgrading zone to recover therefrom a stripping effluent containing hydrogen and hydrocarbons, flowing said stripping effluent out of said catalyst bed and into the low pressure section of said mixing zones into turbulent admixture with said feed mixture, thereby forming a uniform mixture of hydrocarbons and hydrogen while out of contact with said catalyst, and passing said uniform mixture from said mixing zones into said upgrading zone at a plurality of points substantially uniformly distributed throughout the cross section of said catalyst bed, and maintaining therein hydrocarbon upgrading conditions of pressure, temperature and composition to produce said upgraded hydrocarbon.

3. In an apparatus for the upgrading of hydrocarbons by contact thereof with a downwardly moving bed of granular catalyst in the presence of hydrogen, including a vertical contacting column, means for introducing solids at the top and for removing them at the bottom, means for introducing fluid feed and hydrogen at the bottom thereof and means for removing fluid product near the top, the improved means for stripping hydrocarbons from spent catalyst at the bottom of said column, for commingling the resulting stripping effluent with feed vapors and for engaging the resulting mixture by said catalyst, which comprises in combination at least one elongated fluid mixing conduit, means for introducing vaporized feed in the form of a high velocity jet coaxially into one end of said elongated mixing conduit, means for controlling the flow rate thereof so as to maintain a pressure within said mixing conduit below that of said contacting column, a feed fluid engaging means disposed throughout the entire cross section of said column near the bottom thereof and communicating in fluid-receiving relation with said mixing conduit, a solids stripping means disposed below said fluid-engaging means, a fluid inlet to said stripping means, and a fluid outlet from said stripping means, said fluid outlet communicating in fluid-delivery relation with the interior of said mixing conduit.

4. A process according to claim 2 wherein said hydrocarbon comprises a low grade naphtha contaminated with hydrocarbon derivatives of sulfur, said catalyst comprises cobalt molybdate, and the upgrading comprises a simultaneous catalytic desulfurization, and aromatization of said hydrocarbon.

5. An apparatus according to claim 3 wherein said solids stripping means below said feed fluid mixture engaging means comprises a plurality of parallel open-ended conduits depending from a transverse tray in said column.

6. An apparatus according to claim 5 wherein said feed fluid mixture engaging means comprises a plurality of caps disposed uniformly throughout the cross section of said column, a plurality of said elongated mixing conduits with one of said conduits disposed vertically below each of said caps, an integrally attached coaxial skirt depending from the bottom of each of said mixing conduits and having their lower openings disposed just above the upper opening of an open-ended conduit comprising said stripping means, a manifold disposed within said column adjacent said mixing conduits and skirts, and a fluid inlet conduit through the column wall and opening into said manifold; said means for forming said high velocity jet comprising a plurality of branch conduits opening from said manifold at one end and having their outlets opening upwardly at the bottom of each mixing conduit whereby the low pressure created within said skirts is adapted to cause flow of stripping effluent thereinto for admixture with said feed fluid.

7. An apparatus according to claim 3 wherein said elongated mixing conduit is disposed horizontally through the wall of said column in fluid discharging relation to said feed fluid engaging means therein, said means for forming said high velocity jet comprising a flow restriction near the upstream end of said mixing conduit and downstream from the inlet end thereof.

8. An apparatus according to claim 7 in combination with a stripping fluid disengaging means disposed within said column between said feed fluid engaging means and said stripping means, and a stripping effluent conduit opening from said stripping means and communicating with the interior of said mixing conduit.

9. An apparatus according to claim 8 wherein said conduit opening from said disengaging means is disposed within said column.

10. An apparatus according to claim 8 wherein said conduit opening from said disengaging means is disposed outside of said column.

References Cited in the file of this patent

UNITED STATES PATENTS

| 2,444,990 | Hemminger | July 13, 1948 |
| 2,543,070 | Shabaker | Feb. 27, 1951 |
| 2,656,304 | McPherson et al. | Oct. 20, 1953 |
| 2,689,821 | Imhoff et al. | Sept. 21, 1954 |
| 2,756,192 | Bergstrom | July 24, 1956 |
| 2,765,260 | Yoder | Oct. 2, 1956 |
| 2,793,170 | Stiles et al. | May 21, 1957 |